US007187485B2

(12) United States Patent
Bernstein et al.

(10) Patent No.: US 7,187,485 B2
(45) Date of Patent: Mar. 6, 2007

(54) INTEGRATED CONTINUOUS SPECTRUM SPATIAL LIGHT MODULATOR

(75) Inventors: Jonathan Jay Bernstein, Medfield, MA (US); Mehmet Remzi Dokmeci, Woburn, MA (US)

(73) Assignee: Corning Incorporated, Corning, NY (US)

( * ) Notice: Subject to any disclaimer, the term of this patent is extended or adjusted under 35 U.S.C. 154(b) by 143 days.

(21) Appl. No.: 10/631,087

(22) Filed: Jul. 31, 2003

(65) Prior Publication Data
US 2005/0024707 A1    Feb. 3, 2005

(51) Int. Cl.
*G02B 26/00* (2006.01)
*G02B 26/08* (2006.01)

(52) U.S. Cl. .................... 359/290; 359/224
(58) Field of Classification Search ............. 359/214, 359/224, 290, 291, 295, 298; 385/15, 18; 310/309
See application file for complete search history.

(56) References Cited

U.S. PATENT DOCUMENTS

| 6,137,941 | A | 10/2000 | Robinson .................... 385/140 |
| 6,200,882 | B1* | 3/2001 | Drake et al. ................. 438/464 |
| 6,204,946 | B1 | 3/2001 | Aksyuk et al. ................. 398/9 |
| 6,445,502 | B1 | 9/2002 | Islam et al. .................. 359/571 |
| 6,496,291 | B1 | 12/2002 | Raj et al. .................... 398/164 |
| 6,542,282 | B2* | 4/2003 | Smith et al. ................. 359/291 |
| 6,760,144 | B2* | 7/2004 | Hill et al. ................... 359/290 |
| 6,778,728 | B2* | 8/2004 | Taylor et al. ................. 385/18 |
| 6,867,897 | B2* | 3/2005 | Patel et al. .................. 359/291 |
| 2001/0026674 | A1 | 10/2001 | Bishop et al. ............... 385/140 |
| 2002/0081070 | A1* | 6/2002 | Tew ............................ 385/39 |
| 2002/0131698 | A1 | 9/2002 | Wilde .......................... 385/31 |
| 2002/0135864 | A1* | 9/2002 | Chiu et al. ................... 359/318 |

(Continued)

FOREIGN PATENT DOCUMENTS

WO    01/56066    8/2001

(Continued)

OTHER PUBLICATIONS

"Digitally controlledfault-tolerant multiwavelength programmable fiber-opticattenuator using a two-dimensional digital micromirror device". Optics Letters, vol. 24, Issue 5, pp. 282-284, Mar. 1999.

*Primary Examiner*—Ricky Mack
*Assistant Examiner*—William Choi
(74) *Attorney, Agent, or Firm*—Joanne N. Pappas; Thomas R. Beall (57) ABSTRACT

A novel spatial light modulator system has a high fill factor MEMS array of tilting mirrors used to attenuate wavelength channels in an optical network and an interface control circuit controlling the tilting mirror array via received control signals. The control signals include definitions of the wavelength channels and desired attenuation. This control circuit may or may not be on the same chip as the mirror array. Each mirror is supported by one or more flexures, located symmetrically or asymmetrically with respect to the mirror's center of gravity, providing single-axis or two-axis rotation. Stiffener ribs at mirror edges provide a flatter mirror. Landing electrodes held at the same potential as the mirror prevent stiction, while strain relief slots relieve stress on the mirror or flexures. Mirrors fabricated from polysilicon or metal are polished flat using a CMP technique. This SLM design is non-interferometric, therefore increased angular tilt provides increased attenuation.

13 Claims, 10 Drawing Sheets

U.S. PATENT DOCUMENTS

| | | | |
|---|---|---|---|
| 2002/0168131 A1 | 11/2002 | Walter et al. | 385/16 |
| 2002/0176151 A1 | 11/2002 | Moon et al. | 359/298 |
| 2003/0031403 A1 | 2/2003 | Taylor et al. | 385/18 |
| 2003/0095307 A1* | 5/2003 | Moon et al. | 359/117 |

FOREIGN PATENT DOCUMENTS

WO    WO 03/027739    4/2003

* cited by examiner

Tilt mirror IL vs. Tilt angle for $\lambda = 1.55\ \mu m$, beam waist ($1/e^2$ radius) $\omega_x = 9\ \mu m$.

INTEGRATED CONTINUOUS SPECTRUM SPATIAL LIGHT MODULATOR

FIELD OF THE INVENTION

This invention relates generally to microelectromechanical (MEMS) devices and more particularly to a high fill factor array of tilting micromirrors used to attenuate and switch light.

BACKGROUND OF THE INVENTION

Spatial light modulators (SLM) are used for dynamic spectral equalization of Dense Wavelength Division Multiplexing (DWDM) signals. In such systems, it is desirable to have so-called "continuous spectrum" capability in which there are no (or minimal) gaps in the SLM response. In addition it is desired to have very fine granularity, so that the wavelength channels can be flexibly defined. Furthermore, it is also desirable to be able to reconfigure the wavelength channels under software control, such that a telecommunication carrier central office can redefine the wavelength channels as needed.

Prior art approaches for performing the above described desired capabilities that are known in the art include, but are not limited to: (1) Texas Instruments' (TI) Digital Micromirror Display (DMD), (2) Grating Light Valve (GLV), (3) Polychromix's version of the GLV, (4) LightConnect's version of an SLM; and (5) Kodak's GEM interferometric SLM.

Disadvantages of these prior art solutions will be outlined below. For instance, with respect to the first prior art approach, TI's Digital micromirror fabrication process requires a very complicated and lengthy process, thereby the produced devices are expensive and additionally are generally only produced in TI's foundry. The mirrors in the TI design must be used as a diffraction grating, with the light input and output at a fixed angle that varies with wavelength.

The second approach utilizing grating light valves (GLV) has serious Polarization Mode Dispersion (PMD) signifying that different polarization modes may see different attenuation or delay through the system due to the narrow conductive stripes that create a preferred polarization. In addition, several pairs of stripes are required in each wavelength channel, which in turn places a lower limit to the size of the channels. Furthermore, the many gaps between stripes induce both scattering and loss of light, adding to insertion loss and limiting the maximum blocking attenuation.

The third prior art approach, the Polychromix GLV device similarly has all the drawbacks of the GLV described above. Its only advantage over the GLV is that the Polychromix stripes move linearly whereas the GLV stripes deform into an arc.

The fourth prior art approach by LightConnect has the disadvantage that it is an interferometric device, and hence, there will likely be difficulty holding −40 dB attenuation over environmental disturbances.

All the interferometric devices, including GLV, Polychromix, and Light-Connect, have great difficulty achieving −40 dB attenuation (blocking) over environmental changes such as temperature, aging, and laser power. This is generally thought to be caused by the interference minimum being extremely narrow and varying with wavelength.

A new approach is needed that preferably does not include an interferometric device, provides that the attenuation versus control voltage is essentially monotonic, and provides that an increase in tilt produces more attenuation. With no narrow minima to hit, 40 dB attenuation (blocking) of individual channels can be easily maintained or exceeded.

SUMMARY OF THE INVENTION

A design is provided for a MEMS tilt mirror approach which is not interferometric, where the attenuation vs. tilt angle is essentially monotonic such that the more tilt provided the more attenuation produced. With no narrow minima to hit, 40dB attenuation (blocking) of individual channels is easily maintained or exceeded.

One embodiment of the present invention relates to a spatial light modulator system having a high fill factor MEMS array of tilting mirrors which are used to attenuate a plurality of wavelength channels in an optical network and having an interface control circuit to control the array of tilting mirrors where the control circuit is capable of receiving and storing control signals. One embodiment of the invention relates to the interface control circuit and the array of mirrors being fabricated on the same monolithic substrate. Another embodiment of the invention relates to the interface control circuit and the array of mirrors not being fabricated on the same monolithic substrate. In a preferred embodiment of the present invention the control signals include definitions for the extent of each of the wavelength channels and a desired attenuation within each of the wavelength channels. Further embodiments relate to the MEMS array being linear and the high fill factor being greater than or equal to 90%.

In yet another preferred embodiment of the present invention each tilting mirror in the MEMS array includes a single tilting cantilever supported by two flexures. Additionally, each mirror has at least one actuation electrode. In still yet another preferred embodiment of the present invention, each tilting mirror in the MEMS array includes a single tilting cantilever with an asymmetric or off center flexure resulting in 2-axis rotation. Additionally in this embodiment, each mirror has at least one actuation electrode.

Another embodiment of the present invention relates to each mirror in the MEMS mirror array being supported by side support flexures whose rotational axis is offset from the center of gravity of the mirror and wherein each mirror has means for providing strain relief, while yet another embodiment relates to each mirror in the MEMS mirror array being supported by symmetrically located flexures whose rotational axis passes through the center of gravity of the mirror and wherein each mirror has means for providing strain relief.

Further embodiments of the invention relate to each mirror having at least one landing electrode with the same potential as the mirror, each mirror having means for maintaining mirror flatness such as having at least one stiffener rib located above or below the mirror plane, and each mirror being fabricated of a polysilicon or metal layer.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF THE DRAWINGS

The invention is further illustrated with reference to the following drawings in which.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
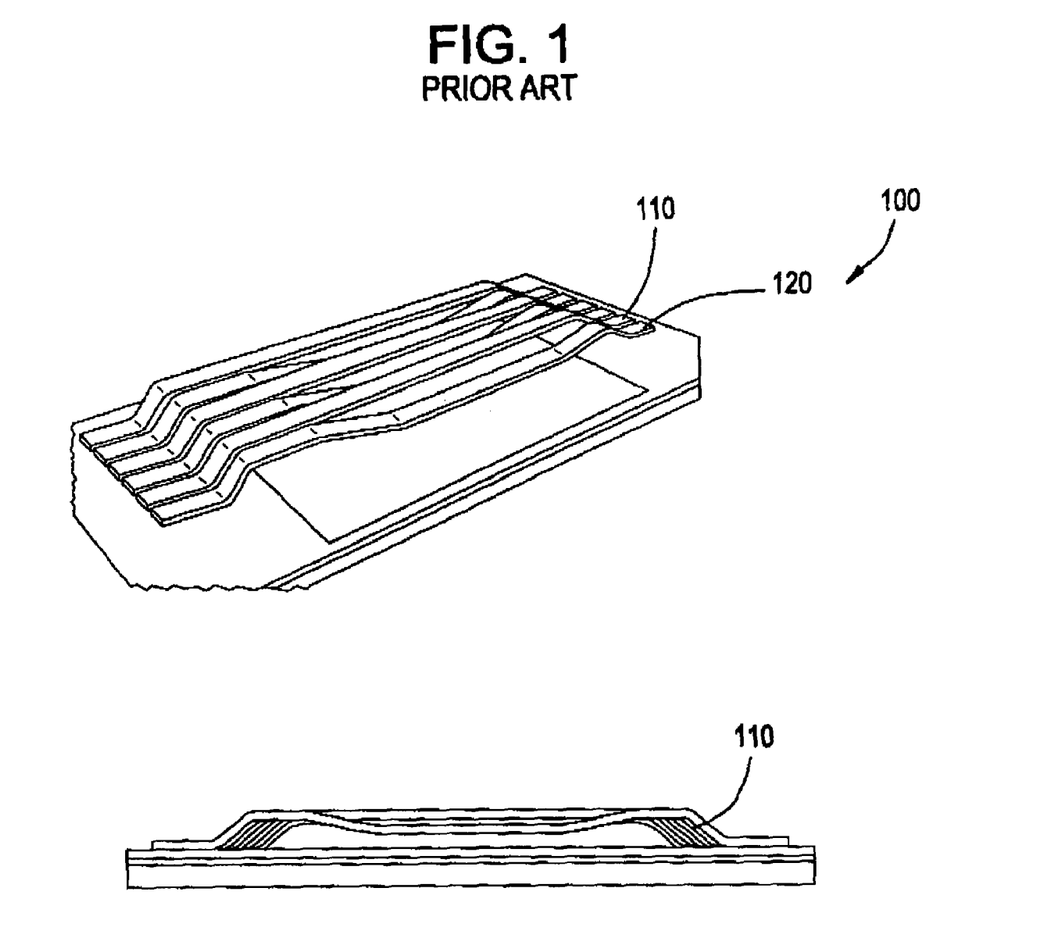
FIG. 1 is an example of a prior art Grating Light Valve (GLV) Interferometer.

Referring to FIG. 1 a prior art MEMS Grating Light Valve (GLV) interferometer 100 is shown having alternate ribbons 110 and 120 deflected to create a square-well diffraction grating. As shown in FIG. 1, ribbons 110 and 120 are longer than the width of a pixel creating a diffracting region in the center.

Figure 2:
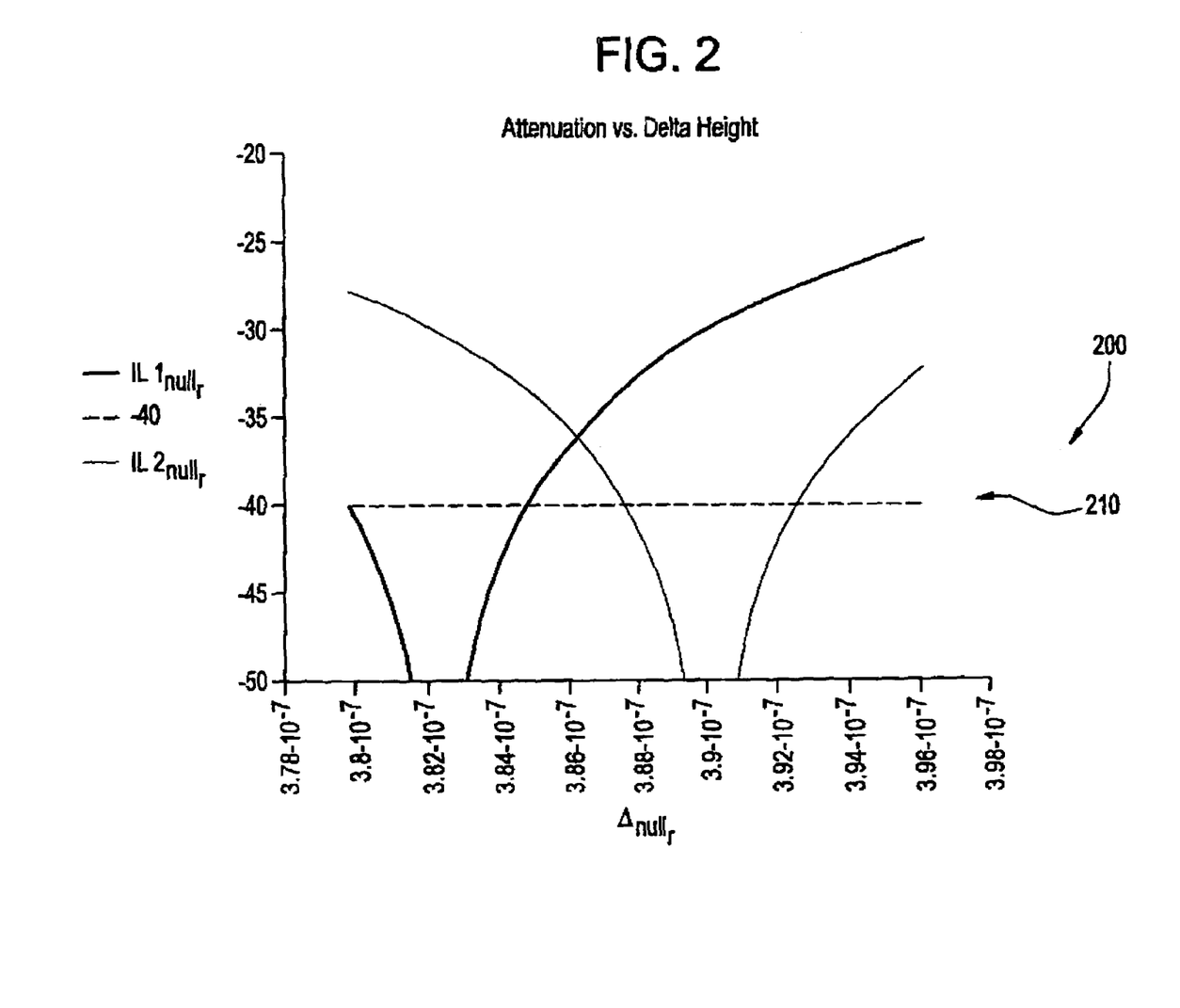
FIG. 2 is a plot of attenuation or insertion loss (IL) versus interferometer height difference in meters, for channel 1 ($\lambda$=1.529 µm) and channel 81 ($\lambda$=1.560 µm) of the C-band International Telecommunications Union (ITU) grid.

FIG. 2 shows a plot 200 of the attenuation in dB versus the relative displacement $\Delta$ of the two sets of ribbons 110 and 120 of FIG. 1 for a GLV device. The allowable variation in step height $\Delta$ is only about 4 nm at −40 dB attenuation (shown at 210), and the various wavelength channels must be tuned with different step heights.

Hence, in order to maintain 40 dB attenuation, the total range of allowable motion is only 4 nm. In addition, there is a strong wavelength dependence on this displacement, hence each wavelength section of the GLV would need a different relative displacement to achieve blocking.

Thus, the narrow deflection range and wavelength dependence imply that interferometric attenuation cannot be used for blocking at −40 dB without some kind of tight feedback loop to eliminate the effects of drift, aging and temperature.

Figure 3:
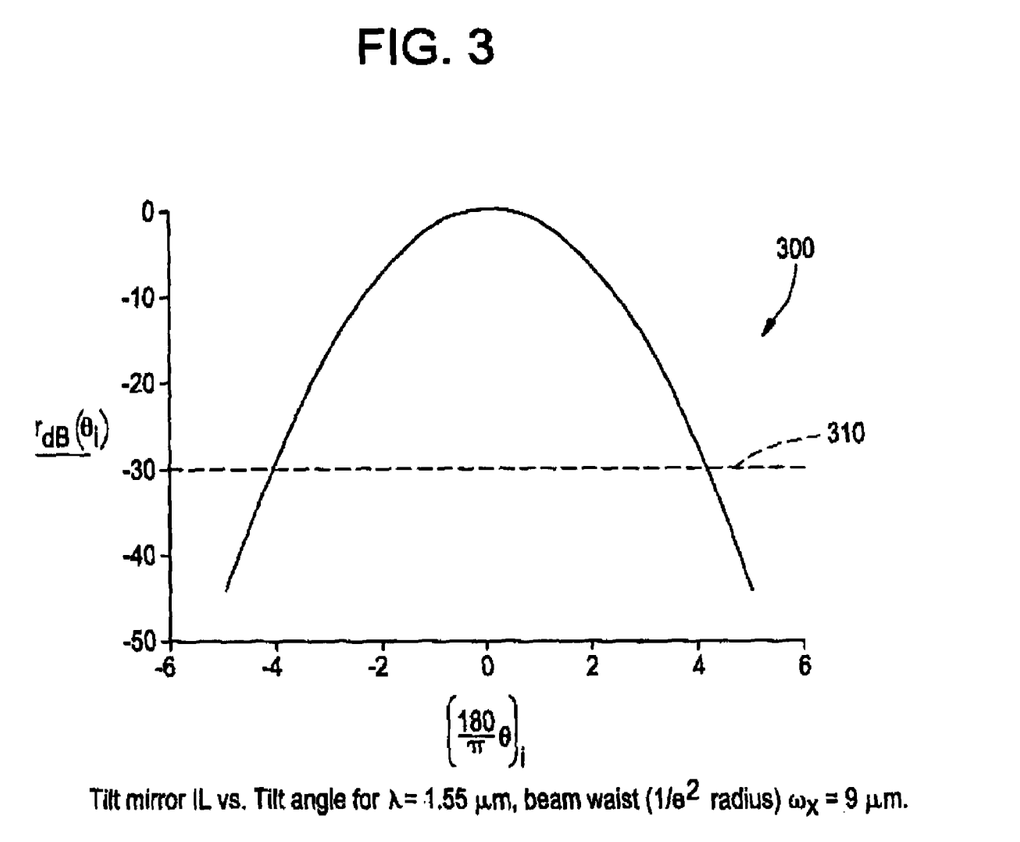
FIG. 3 is a plot of tilt mirror insertion loss (IL) versus tilt angle for $\lambda$=1.55 µm, and beam waist ($1/e^2$ power radius) $\omega_x$=9 µm in accordance with a preferred embodiment of the present invention.
Figure 4:
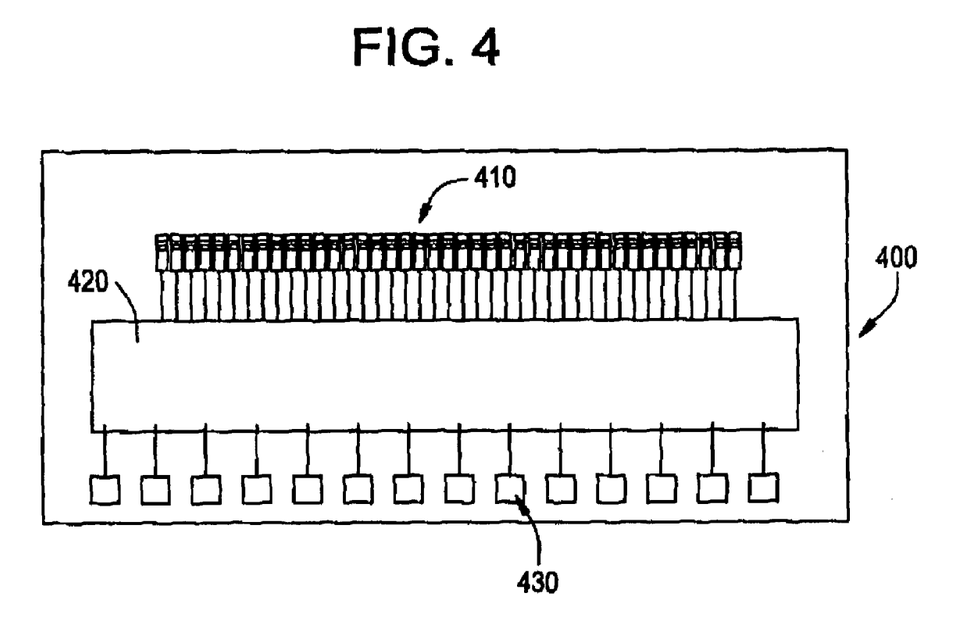
FIG. 4 is a top view of a mirror array with CMOS control circuit in accordance with a preferred embodiment of the present invention.

In contrast to the case of the interferometer, a tilting mirror has a monotonic attenuation versus angle curve, as shown in the plot 300 of FIG. 3 in accordance with a preferred embodiment of the present invention shown in FIG. 4. As indicated in FIG. 3, the attenuation curve is monotonic from 0 (zero) voltage to either increasing or decreasing voltages.

Since curve 310 is monotonic near −40 dB, channel blocking is much easier than the interferometer case described above. Any angle greater than 4.8 degrees will achieve the desired attenuation.

Advantageously, the preferred embodiment of the present invention has an array of tilting mirrors 400 as shown in FIG. 4 that serve to deflect, thereby attenuating the light. These present invention mirrors are arranged in one or several rows with extremely "high fill factor" of greater than or equal to 90% within each row. Furthermore, the tilting mirrors can also be used to switch light signals between channels.

This present invention includes a linear array of MEMS mirrors forming an array of variable attenuators 400. FIG. 4 shows an array of tilting mirrors 410 controlled by ASIC 420. The ASIC is preferably on the same chip or monolithic substrate as the mirrors 410 as shown, or alternatively it may be designed on a separate chip or monolithic substrate. If a low temperature process is used for the mirrors 410, then the mirrors can be added by post-processing of the CMOS ASIC wafer.

In future Dense Wavelength Division Multiplexing systems (DWDM) and optical network applications, the channel definitions of the extent of a wavelength may be changed over time. For instance, a 40 wavelength system may migrate to an 80 wavelength system. Rather than replace all the optical components, it is highly desirable to be able to change the channel definitions by software commands remotely. This is possible with the mirror array system 400 shown in FIG. 4 that includes an ASIC control circuit 420. The ASIC control circuitry 420, as mentioned above, may be integrated on the same chip or alternatively on a separate chip.

System level commands are applied using the Input/Output [I/O] pads 430, which define the optical channels and the degree of attenuation required on each channel. The ASIC circuit or chip 420 interface is capable of receiving and storing these control signals. Chip 420 then applies the appropriate mirror actuation voltages to the large number of mirrors in the array. The number of I/O pads can be much smaller than the number of mirrors in the array. For an SLM, the inputs 430 to the ASIC 420 are preferably the channel definitions and the degree of attenuation required at each wavelength.

Figure 5:
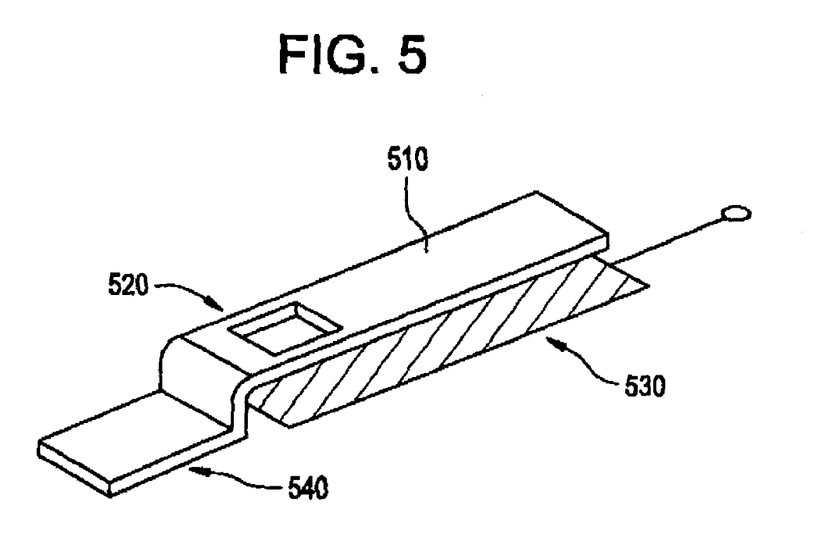
FIG. 5 is a perspective view of a single cantilevered tilting mirror supported by two flexures in accordance with a preferred embodiment of the present invention.

Referring now to FIG. 5 a single cantilevered tilting mirror 510 supported by two flexures 520 is shown in accordance with a preferred embodiment of the present invention. Typically the actuation electrode 530 is fixed to the substrate, while the cantilevered tilt mirror is anchored at one end 540 and free to rotate by deformation of the flexures.

As it is known in the art, the attenuation of a tilting mirror in dB units is represented by equation (1) below:

$$\Gamma_{dB} = 4.343 \left( \frac{4\pi^2 \tan^2\theta \cdot \omega_x^2}{\lambda^2} \right) \quad 1.$$

where θ (theta) is the rotation angle, $\omega_x$ is the beam radius at $1/e^2$ power, and λ is the wavelength.

Figure 6:
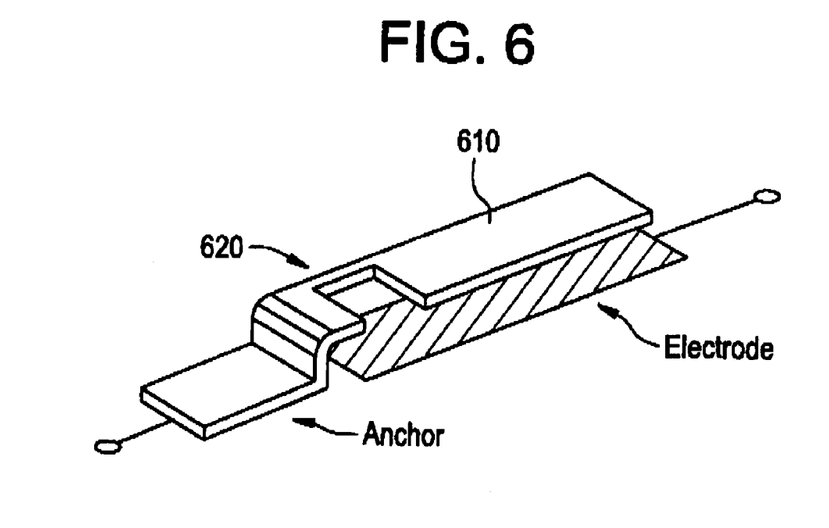
FIG. 6 is a perspective view of a single tilt mirror with asymmetric flexure, resulting in 2-axis rotation and enhanced optical attenuation in accordance with a preferred embodiment of the present invention.

FIG. 6 shows a tilting mirror 610 supported by a single, asymmetric flexure in accordance with an alternate preferred embodiment of the present invention. This mirror 610 will rotate about 2 axes and leads to enhanced attenuation.

As it is known in the art, the attenuation for 2-axis rotation is given by equation (2) below:

$$\Gamma_{dB} = 4.343 \left( \frac{4\pi^2 [\tan^2\theta \cdot \omega_x^2 + \tan^2\phi \cdot \omega_y^2]}{\lambda^2} \right) \quad 2.$$

where the variables have the same meaning as in equation 1, $\omega_x$ is the Gaussian beam radius in the x direction, $\omega_y$ is the Gaussian beam radius in the y direction, and an additional rotation φ (phi) is introduced for rotation along the y direction.

Figure 7:
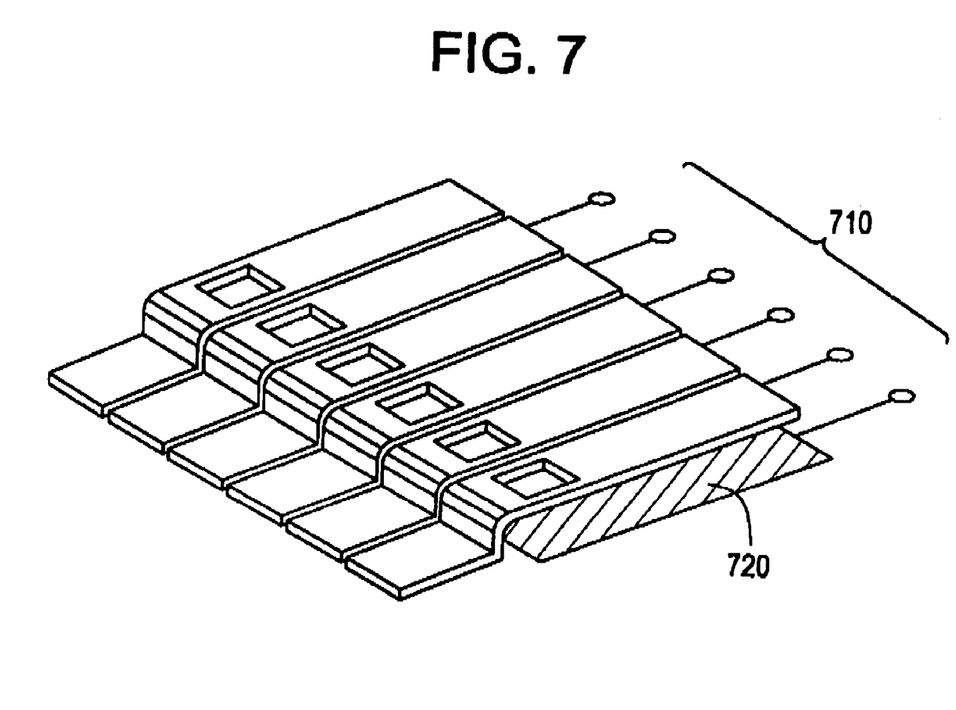
FIG. 7 is a perspective view of an array of tilting cantilever mirrors in accordance with a preferred embodiment of the present invention.

FIG. 7 shows a linear array of tilting mirrors 710, with actuation electrodes in accordance with yet another preferred embodiment of the present invention. Each mirror has a separate actuation electrode 720, and all the mirrors can be grounded. Alternatively, the mirrors 710 can be actuated with control voltages while the electrodes 720 underneath are grounded.

Figure 8:
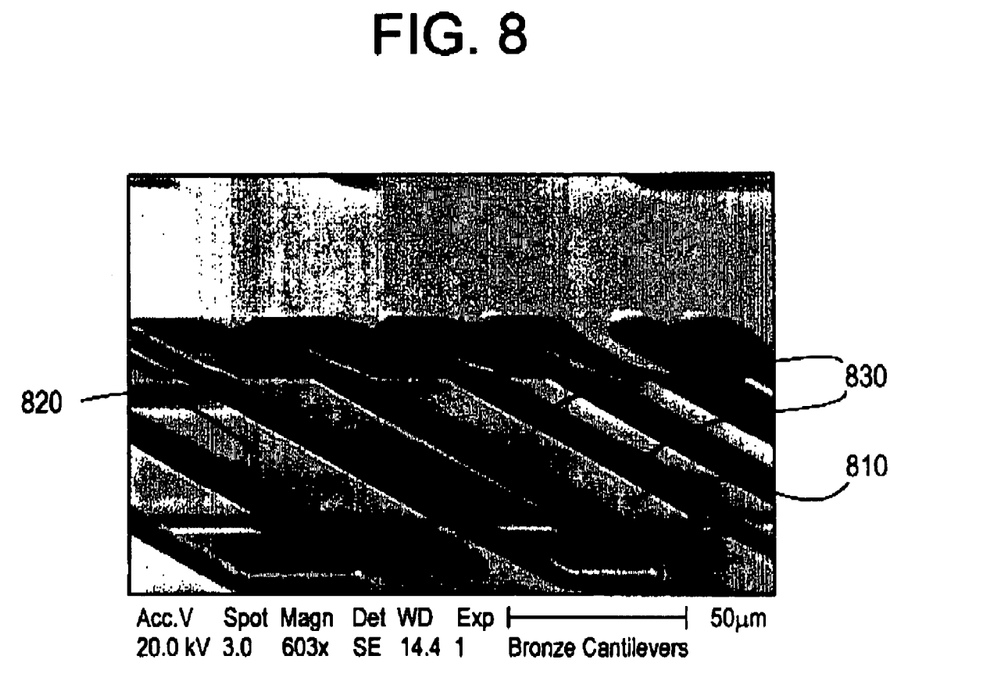
FIG. 8 is a perspective view of metal cantilevers and bridges fabricated with stiffener ribs to enhance flatness in accordance with a preferred embodiment of the present invention.

FIG. 8 shows a preferred embodiment of the present invention including an array of cantilever mirrors 810 and bridge structures 820 fabricated using a thin-film metal process and a polymer sacrificial layer. To enhance flatness, stiffener ribs 830 are located above or below the mirror plane and are included at the edges of the mirror or at the metal cantilevers. These stiffener ribs 830 are a novel advancement to the art of MEMS mirror fabrication. They allow the mirrors 810 to be much flatter for a given mirror thickness than a simple planar mirror could be, while keeping mass to a minimum.

Alternate embodiments of the present invention which include spatial light modulator applications are shown in FIGS. 9–12 described below.

Figure 9:
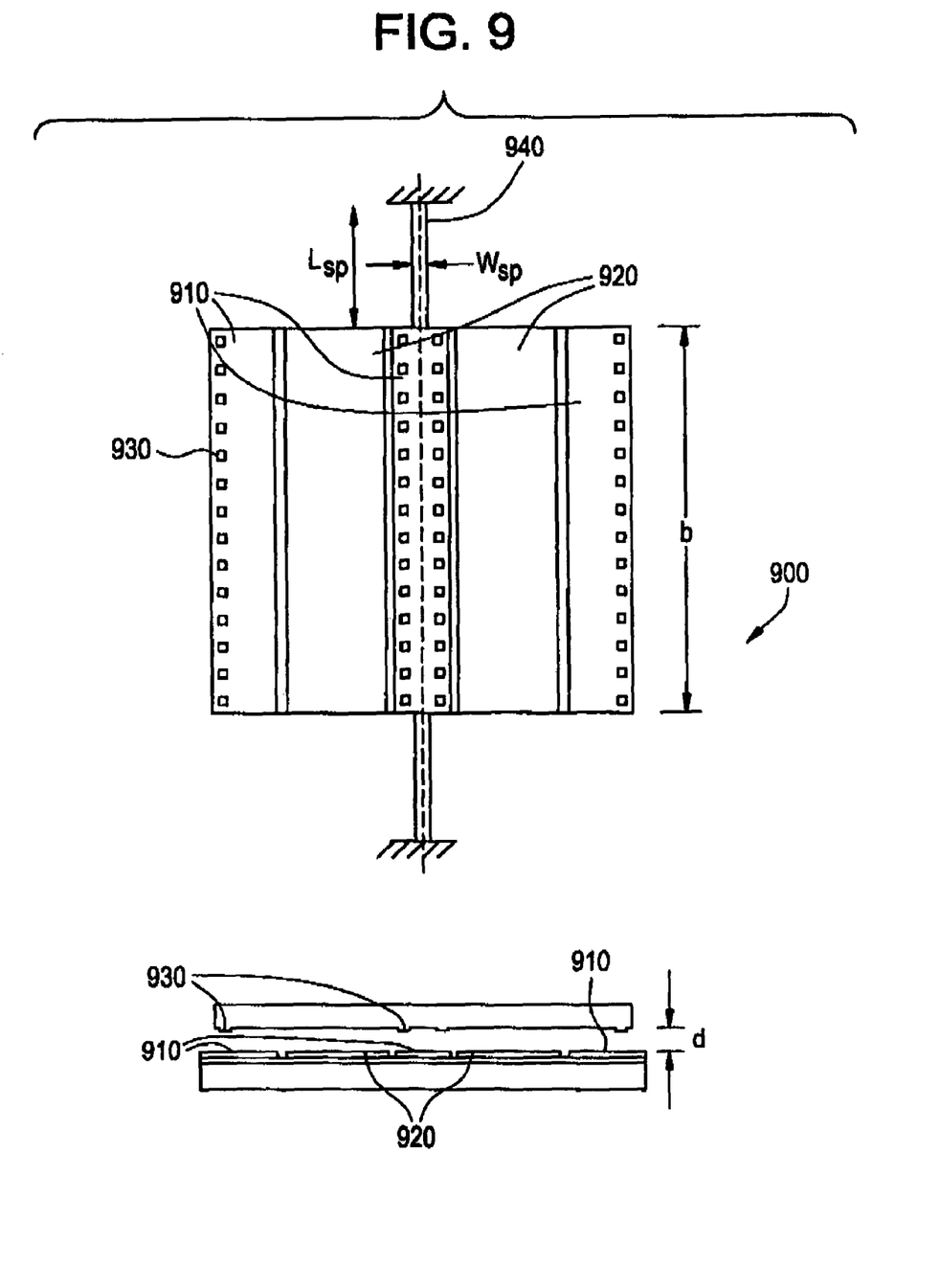
FIG. 9 show a plan and cross-sectional view of a symmetric tilt mirror where edge and center electrodes are held at the same potential as the mirror to avoid sticking in accordance with a preferred embodiment of the present invention.

For instance, in FIG. 9, a preferred symmetric embodiment of the present invention is shown providing a tilting mirror 900 including landing electrodes 910 held at the same potential as the mirror 900, drive or actuation electrodes 920, dimples 930 and flexures 940. With the electrodes 910 held at the same potential as the mirror, stiction is prevented in accordance with a preferred embodiment of the present invention.

Figure 10:
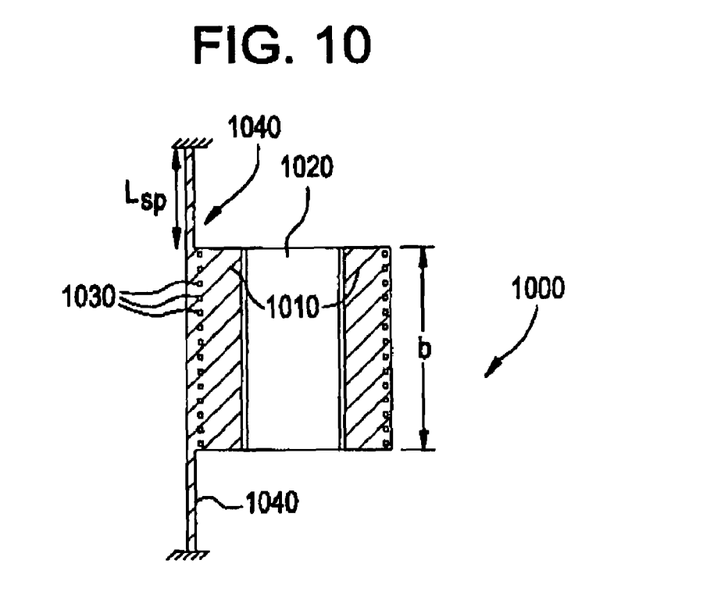
FIG. 10 is a schematic view of a single-sided mirror in accordance with a preferred embodiment of the present invention.

FIG. 10 shows an asymmetric single-sided version of a tilting mirror 1000, including landing electrodes 1010 at the same potential as the mirror, a drive or actuation electrode 1020, dimples to prevent stiction 1030, and flexures 1040 in accordance with embodiments of the present invention. Flexures 1040 have a rotational axis that is offset from the center of gravity of the mirror.

Figure 11:
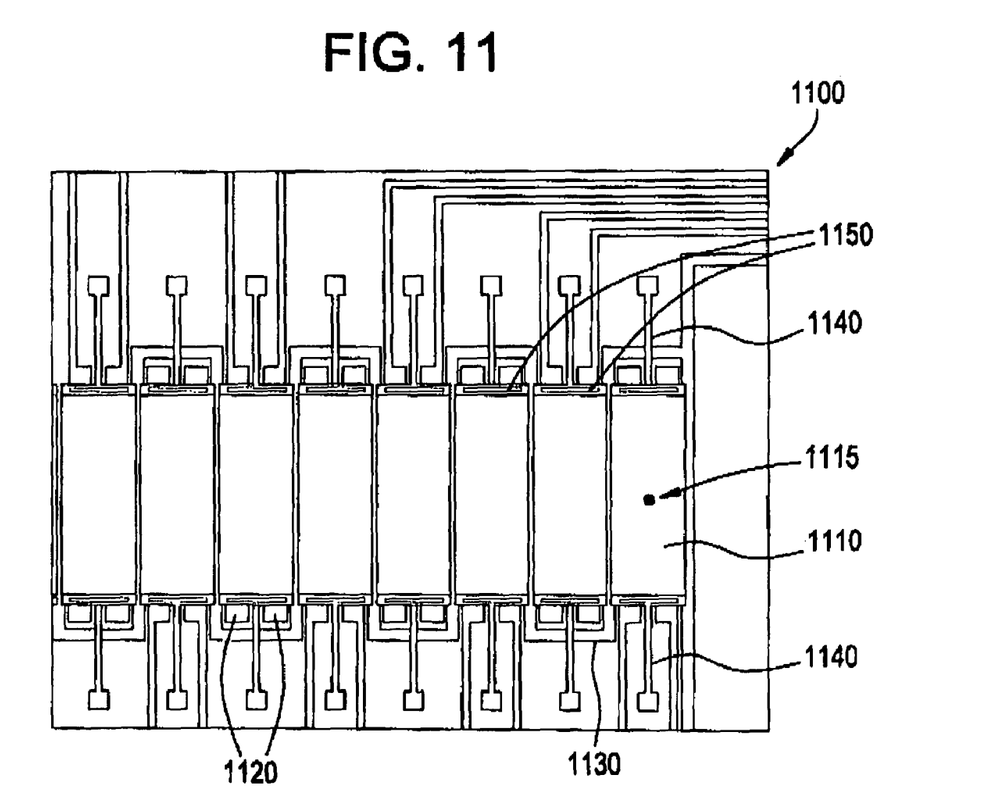
FIG. 11 is a top view of a fabricated tilt-mirror array having central flexure support in accordance with a preferred embodiment of the present invention.
Figure 12:
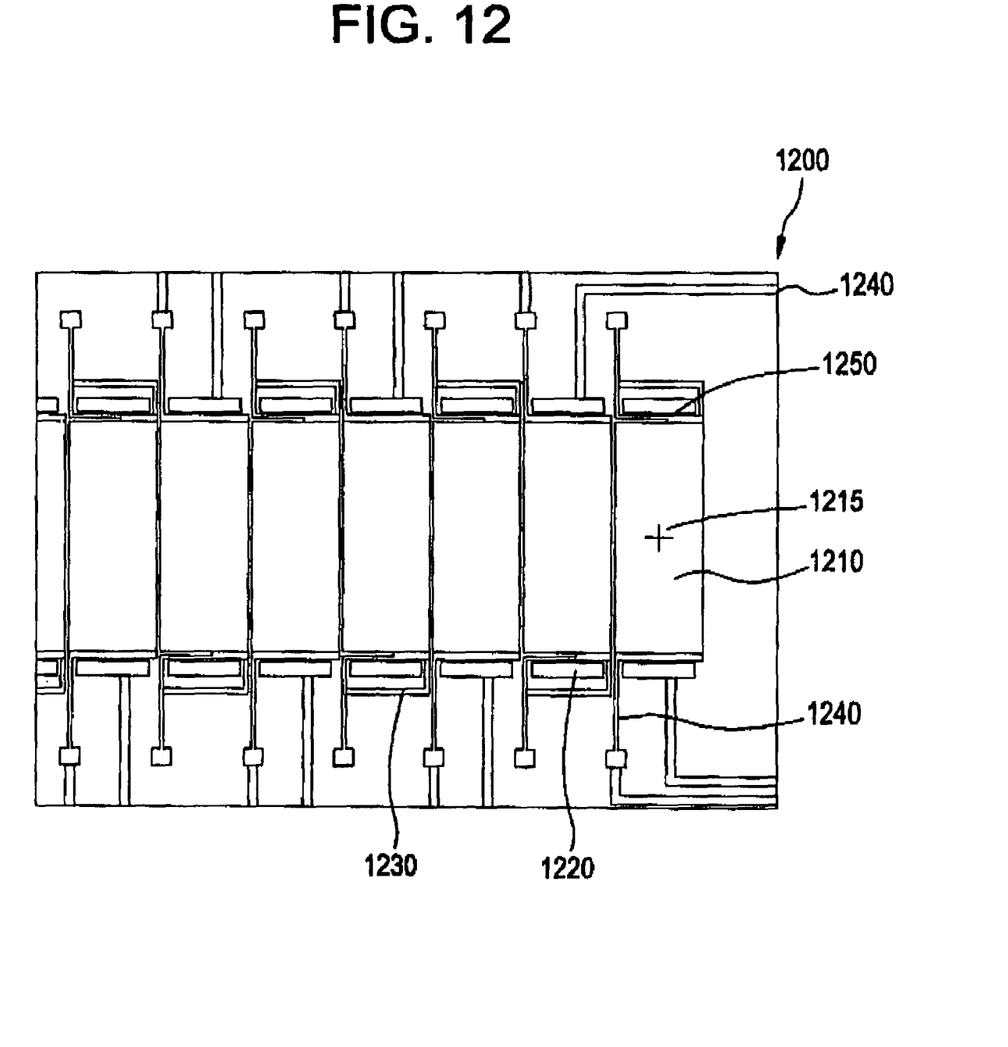
FIG. 12 is a top view of a fabricated tilt-mirror array with side support flexures in accordance with a preferred embodiment of the present invention.

Additionally, FIGS. 11 and 12 depict fabricated SLM mirror arrays 1100 and 1200 respectively, according to the present invention. In FIG. 11, symmetrically located flexures 1140 whose rotational axis passes through the center of gravity 1115 of the mirror 1110. Strain relief slots 1150 may also be incorporated to relieve any stress in the mirror 1110 or flexures 1140. Landing electrodes 1130 are held at the same potential as the mirror 1110.

In FIG. 12, asymmetrically located flexures 1240 have a rotational axis that is offset from the center of gravity 1215 of the mirror 1210. Strain relief slots 1250 may also be incorporated to relieve any stress in the mirror 1210 or flexures 1240. Landing electrodes 1230 are held at the same potential as the mirror 1210. Actuation electrodes 1120, 1220 are also provided in FIGS. 11 and 12 acting to move the mirror when a voltage is applied.

These arrays are preferably fabricated using a thick polysilicon or metal mirror layer which is polished flat using a CMP (Chemical Mechanical Planarization) technique. A sacrificial layer of $SiO_2$ or PSG (phospho-silicate glass) may also be used to free up the mirrors.

Figure 13:
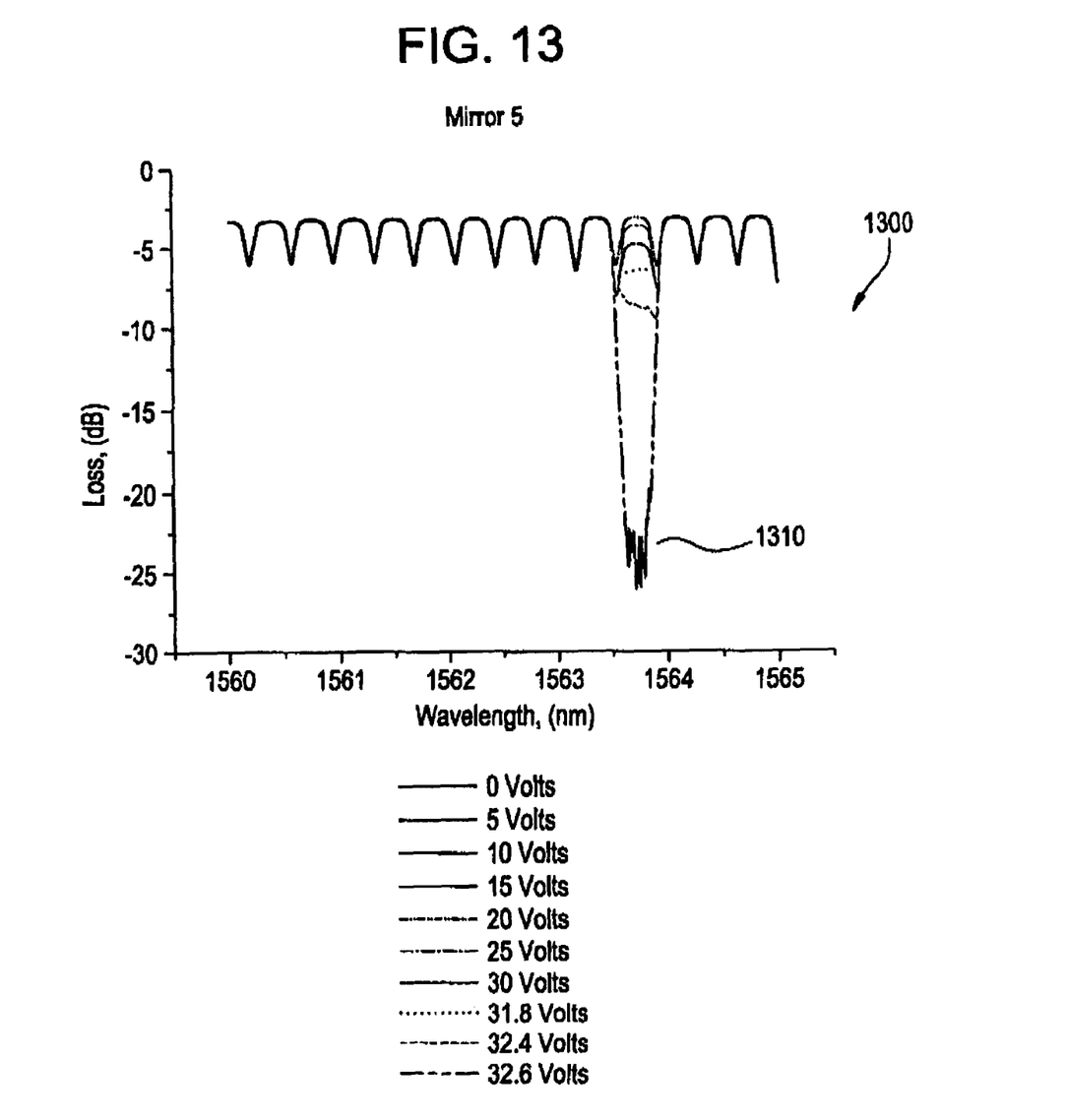
FIG. 13 is a plot of attenuation for a MEMS SLM as a function of wavelength and applied voltage in accordance with a preferred embodiment of the present invention.

Preliminary test data on an array similar to that of FIG. 11 is shown in plot 1300 of FIG. 13. The attenuation of a single channel is shown vs. applied voltage. Approximately 21 dB attenuation at 3 degree rotation is demonstrated on one wavelength channel as shown at 1310.

Several commercial applications in addition to the Spatial Light Modulator applications discussed above are contemplated for use with the embodiments of the present invention such as, but not limited to, for instance, Dynamic Spectral Equalizer, the Dynamic Channel Equalizer and Wavelength Selective Switch applications.

Having described various preferred embodiments of the present invention, it will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

The invention claimed is:

1. A spatial light modulator system comprising:
   a high fill factor MEMS array of tilting mirrors used to attenuate a plurality of wavelength channels in an optical network, said array of tilting mirrors supported by symmetrically located flexures whose rotational axis passes through the center of gravity of the mirror and wherein each mirror further comprises means for providing strain relief; and
   an interface control circuit controlling said array of tilting mirrors, said interface circuit receiving and storing control signals to reconfigure wavelength channel definitions wherein said control circuit and said array of mirrors are not fabricated on the same monolithic substrate.

2. The modulator system of claim 1 wherein said control circuit and said array of mirrors are fabricated on the same monolithic substrate.

3. The modulator system of claim 1 wherein said control signals further comprise definitions for the extent of each of said plurality of wavelength channels.

4. The modulator system of claim 1 wherein the control signals further comprise a desired attenuation within each of said plurality of wavelength channels.

5. The modulator system of claim 1 wherein said MEMS array is linear.

6. The modulator system of claim 1 wherein said high fill factor is greater than or equal to 90%.

7. The modulator system of claim 1 wherein each mirror in said MEMS array of tilting mirrors further comprises a single tilting cantilever supported by two flexures.

8. The modulator system of claim 7 wherein each mirror has at least one actuation electrode.

9. A spatial light modulator system comprising:
   a high fill factor MEMS array of tilting mirrors used to attenuate a plurality of wavelength channels in an optical network; and
   an interface control circuit controlling said array of tilting mirrors, said interface circuit receiving and storing control signals to reconfigure wavelength channel definitions
   wherein each mirror in said MEMS array of tilting mirrors further comprises a single tilting cantilever with an asymmetric flexure resulting in 2-axis rotation.

10. The modulator system of claim 9 wherein each mirror has at least one actuation electrode.

11. A spatial light modulator system comprising:
   a high fill factor MEMS array of tilting mirrors used to attenuate a plurality of wavelength channels in an optical network; and
   an interface control circuit controlling said array of tilting mirrors, said interface circuit receiving and storing control signals to reconfigure wavelength channel definitions wherein each mirror in said MEMS array of tilting mirrors is supported by side support flexures whose rotational axis is offset from the center of gravity of the mirror wherein each mirror further comprises means for providing strain relief.

12. A spatial light modulator system comprising:
   a high fill factor MEMS array of tilting mirrors used to attenuate a plurality of wavelength channels in an optical network;
   an interface control circuit controlling said array of tilting mirrors, said interface circuit receiving and storing control signals to reconfigure wavelength channel definitions wherein said control circuit and said array of mirrors are not fabricated on the same monolithic substrate and
   wherein each mirror has at least one landing electrode having a same potential as said mirror.

13. A spatial light modulator system comprising:
   a high fill factor MEMS array of tilting mirrors used to attenuate a plurality of wavelength channels in an optical network; and
   an interface control circuit controlling said array of tilting mirrors, said interface circuit receiving and storing control signals to reconfigure wavelength channel definitions wherein each mirror in said MEMS array of tilting mirrors further comprises means for maintaining mirror flatness wherein said means for maintaining mirror flatness further comprises at least one stiffener rib located above or below the mirror plane and wherein each of said MEMS mirrors is fabricated of a polysilicon or metal layer and wherein said mirror layer is polished flat using a CMP (Chemical Mechanical Planarization) technique.

* * * * *